CHRISTOPHER JOHN LAKE (NAME CHANGED FROM JOHN CHRISTOPHER LAKE BY JUDICIAL ORDER).
MOTIVE POWER APPARATUS.
APPLICATION FILED MAR. 20, 1908.
914,583.
Patented Mar. 9, 1909.
3 SHEETS—SHEET 1.
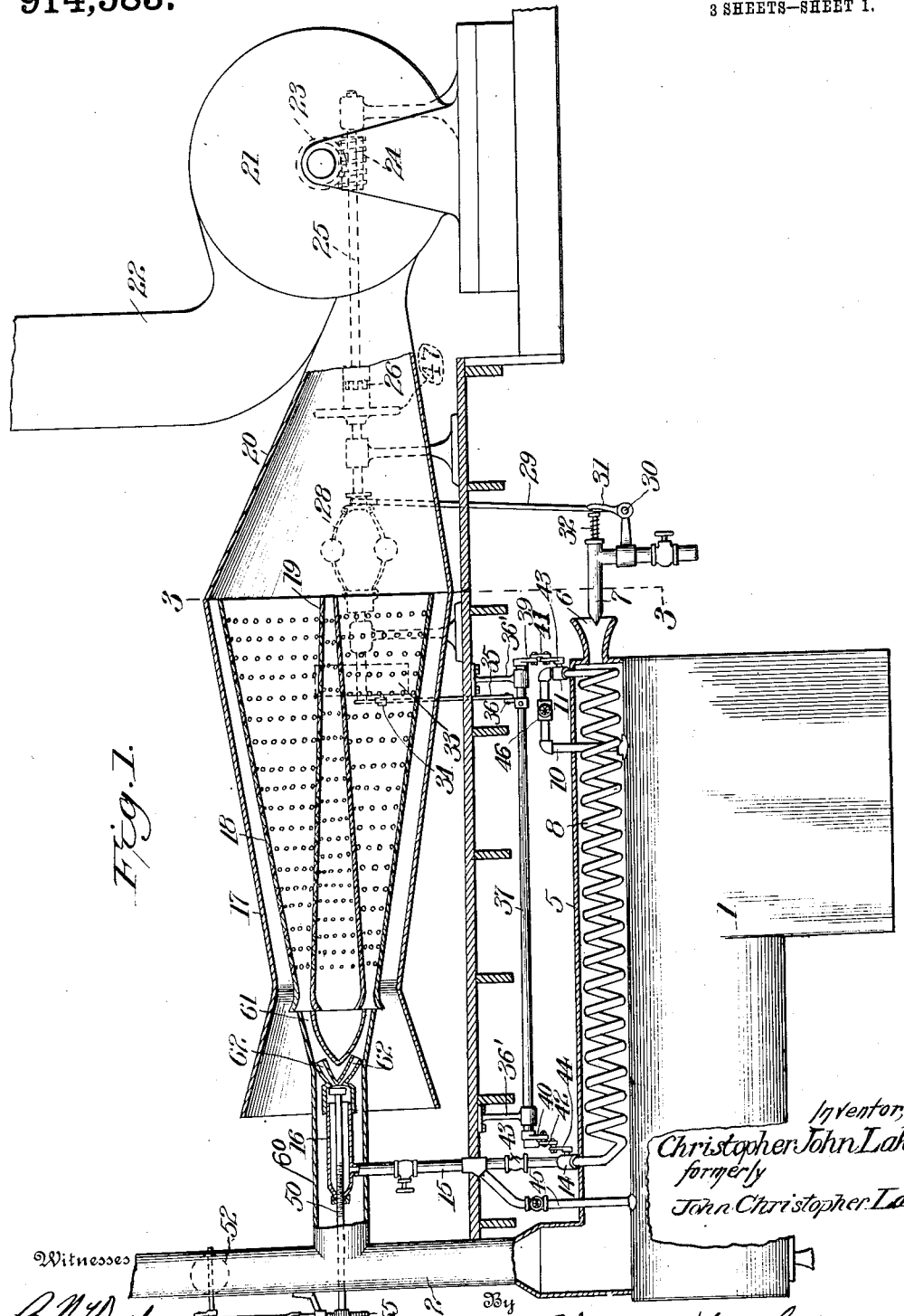

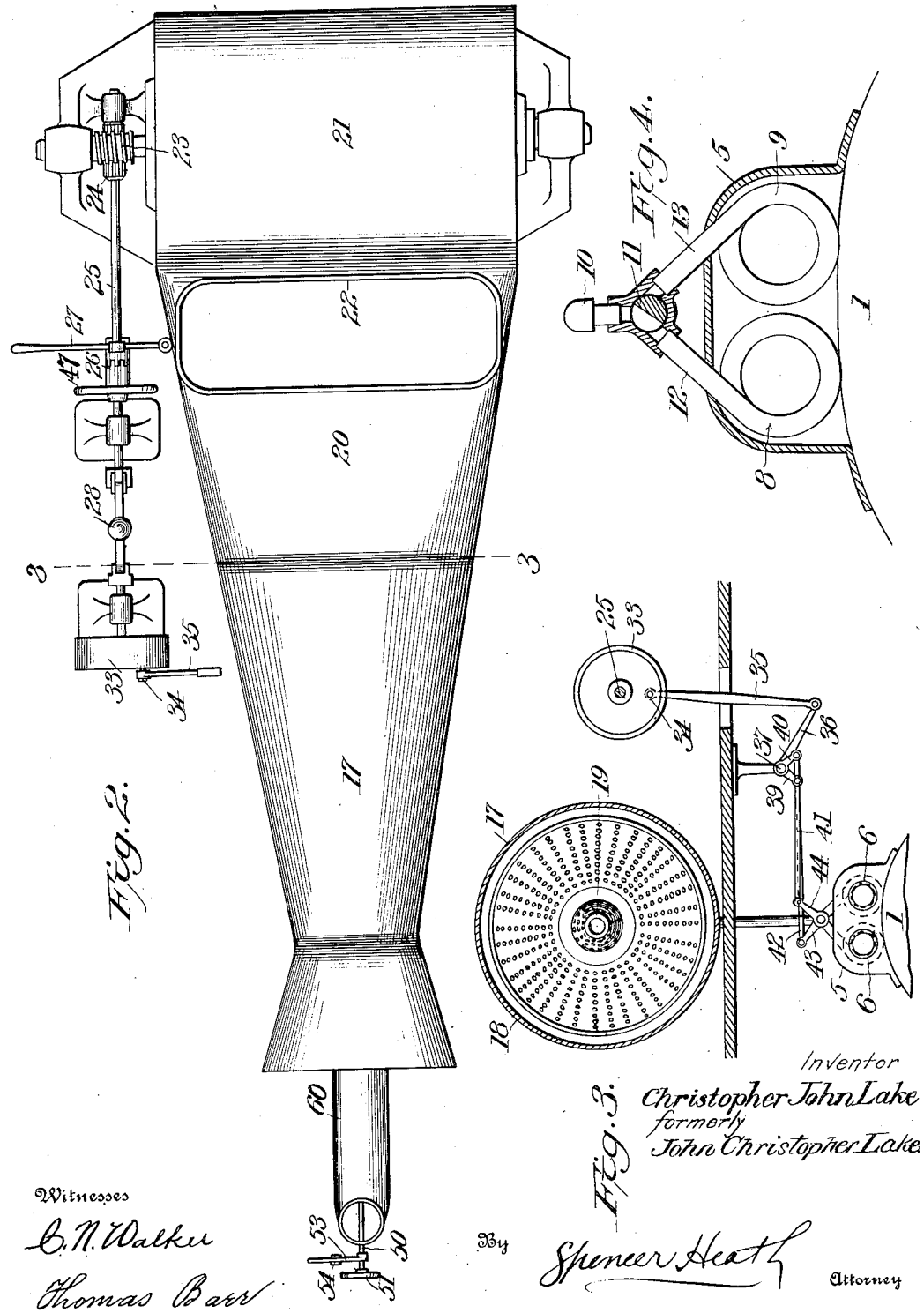

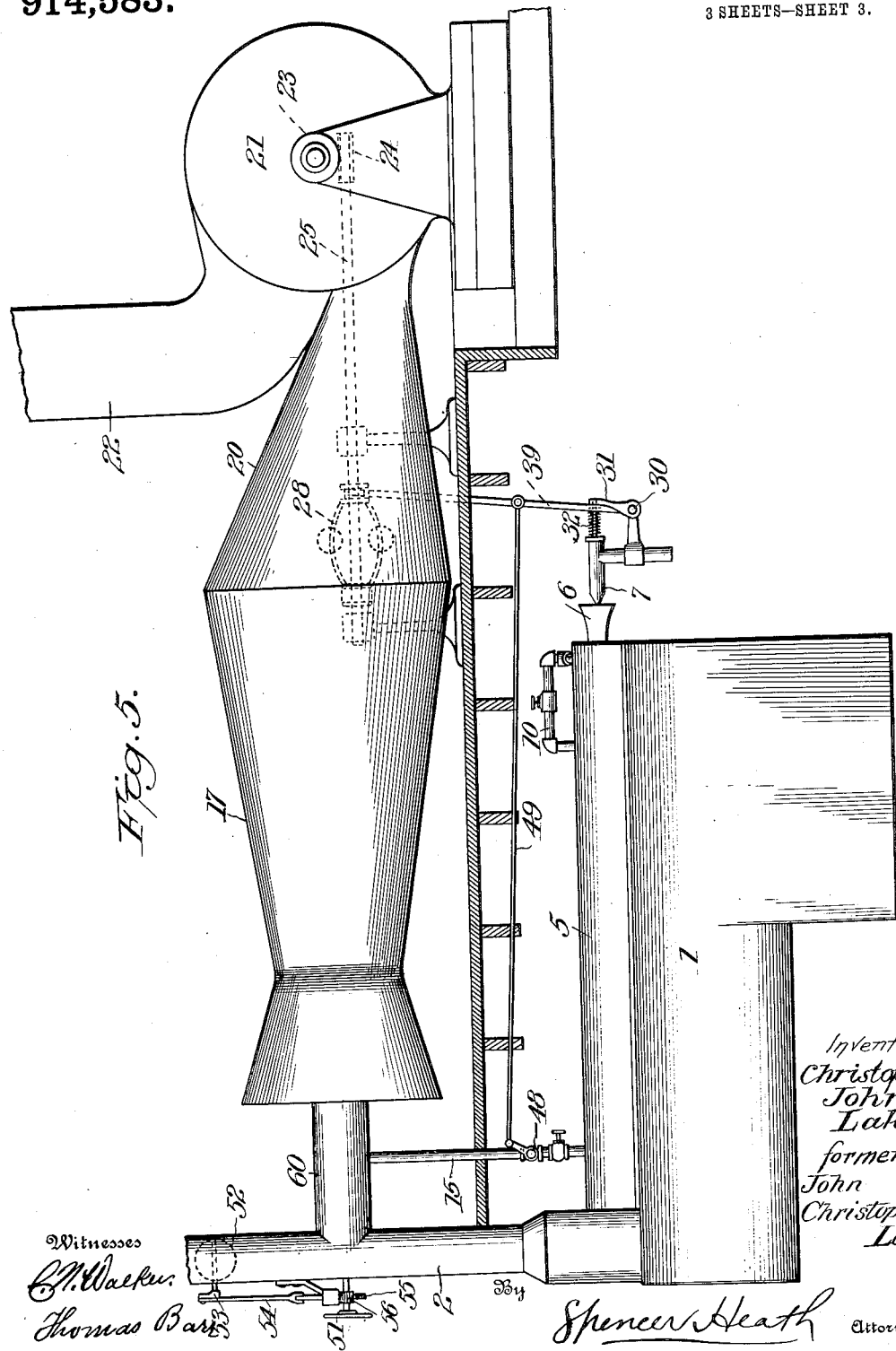

UNITED STATES PATENT OFFICE.

CHRISTOPHER JOHN LAKE, (NAME CHANGED FROM JOHN CHRISTOPHER LAKE BY JUDICIAL ORDER,) OF BRIDGEPORT, CONNECTICUT.

MOTIVE-POWER APPARATUS.

No. 914,583.     Specification of Letters Patent.     Patented March 9, 1909.

Application filed March 20, 1908. Serial No. 422,310.

*To all whom it may concern:*

Be it known that I, CHRISTOPHER JOHN LAKE, (formerly JOHN CHRISTOPHER LAKE,) a citizen of the United States, and resident of Bridgeport, in the county of Fairfield and State of Connecticut, have invented certain new and useful Improvements in Motive-Power Apparatus, of which the following is a specification.

The invention relates to apparatus for the production and utilization of steam power and has particular reference to a novel method of increasing the power and efficiency of steam that has been generated in any known form of boiler and of utilizing the energy of the steam thus treated.

One object of my invention is to superheat and at the same time increase the pressure of steam drawn from a boiler. This I accomplish by confining successive charges of saturated steam at boiler pressure in a series of receptacles in which it is superheated and its tension increased, and releasing the charges of steam thus treated in rotation from the receptacles.

A further object is to provide a method of applying heat to the superheating receptacles in such manner as to avoid burning or rapid deterioration of the material thereof. This I accomplish by supplying sufficient heat to produce the desired temperature and pressure and regulating the application of heat according to the quantity of steam to be superheated by it. I prefer to do this by using liquid or gaseous fuel and governing the supply of fuel in accordance with the demand for steam.

A further object is to utilize the energy of steam of high temperature and pressure in a rotary motor of slow velocity. I accomplish this by transferring the energy of the steam into a large volume of air in motion, and causing this air blast to act upon the motor.

A further object is to conserve and utilize all of the heat energy contained in the steam and in the waste gases from the firing means connected with the boiler and with the superheating device, a portion of the heat of combustion being used first indirectly to produce a fluid of high temperature and pressure, and the remainder being finally used directly by commingling the hot products of combustion with the power fluid. I accomplish this by utilizing the kinetic energy of the pressure fluid issuing from a series of apertures to impulse the non-pressure hot gases into velocity with the pressure fluid, and then applying the energy of the combined pressure fluid and hot gases to impulse air into velocity, the function of the hot gases being to increase the velocity of the impulsed air by expanding it in its passage to the motor.

The theory of my invention, so far as relates to the use of air and waste gases, is as follows: The efficiency of a rotary motor is known to be greatest when the fluid passing it has a velocity not too greatly exceeding that of its moving parts. With high-pressure steam, therefore, the velocity of the motor must be too high for practical purposes, and with low-pressure steam, though the efficiency of the motor itself might be high, there is very poor economy on account of the large amount of water that must be evaporated to produce a very small amount of available power. High-pressure steam may be used with economy, however, if its high kinetic energy or velocity-power can be first transferred to a relatively inert mass of air. This produces a large volume of air and steam moving at slower velocity, but having a power and energy equal to that of the steam, and such a current of comparatively slow velocity may be used in a rotary engine with far greater efficiency than the steam alone. The advantages of using a large volume of air in this way have not always been easily secured on account of the difficulty of obtaining perfect assimilation between the high-velocity steam and the inert air. It has been found that the steam will cut its way through the inert air without giving up its heat to the air and setting it in motion, the steam tending to pass alone through the motor and exhaust at very high and uneconomical temperatures. I overcome this difficulty by the use of my special steam and air assimilator which I have described and claimed in my application for Letters Patent No. 269,629, filed July 14, 1905. By the use of my assimilator, I am able to effect a mixture of air with steam of very high initial velocity, and then use this mixture efficiently in a motor. The effect of this arrangement is that the motor acts on purely mechanical principles, like a water wheel or windmill, and not as a heat engine. The heat employed is not used in the motor, but in the production of a fluid current of low velocity and large volume, suitable to be utilized at low temperature in a mechanical motor, without the radiation and other losses commonly incident to heat engines.

The arrangement I have described above owes its advantages largely to the high efficiency with which the energy of the steam is transferred to the air and its heat converted into motion. This suggests the desirability of using the steam at the highest possible pressure and of applying additional heat to the steam at the same time. Accordingly, I prefer to superheat this steam to a very high pressure and cause it to mingle with the hot waste gases from the boiler furnace and the superheater before it reaches its point of application to the air, which then takes up and utilizes with the impulsive power of the steam the heat of the gases that would otherwise be wasted heat and energy.

The principles of my invention may be utilized in various modes and in connection with various forms of apparatus, but the preferred manner in which I have contemplated applying them is hereinafter described by reference to the accompanying drawings, in which, Figure 1 is a side view of the complete apparatus, some portions being cut away to illustrate other portions beyond. Fig. 2 is a top view of the complete apparatus. Fig. 3 is a sectional view on line 3—3 of Figs. 1 and 2. Fig. 4 is an enlarged sectional view showing the style of cut-off valve employed and the ends of the superheating coils. Fig. 5 is an elevation similar to Fig. 1, but showing a modified form of the apparatus.

Similar reference characters are used to designate corresponding parts throughout the drawings.

1 is a boiler of ordinary construction having a smoke pipe 2, leading from the furnace and from the interior of the superheater casing. Arranged over the boiler is a casing 5 having communication at one end with the smoke pipe and provided at the other end with a pair of air induction ports 6 surrounding the ends of a pair of liquid fuel or gas burners 7. Inside of the casing 5 there is a pair of coils 8 and 9. These are in communication with the steam space of the boiler by the pipe 10 leading to the valve 11 which may be turned to admit steam to either of the coils 8 and 9 by the branch pipes 12 and 13. The opposite ends of coils 8 and 9 terminate in a valve 14 which is constructed in a similar manner to valve 11, as illustrated in Fig. 5. Steam passes through the coils to the valve 14 and the pipe 15, which leads to a valve or adjustable nozzle 16. Pipes 10 and 15 are fitted with cut-off valves 46 and 43.

17 is the outer casing of my steam and air assimilator containing a flaring perforated shell 18 and a tapering perforated shell 19 within the shell 18, the two perforated shells being arranged to form an expanding annular passage.

20 is a continuation of casing 17 forming a passage to the motor 21.

22 is an exhaust conduit leading from the motor. The motor shaft is provided with a worm 23 engaging a gear 24 on the governor shaft 25. This shaft is provided with a clutch 26 operated by lever 27 and carries a double governor arrangement to control the admission of steam from the superheating coils to the conduits leading to the motor and to control the supply of fuel to the burners 7 in proportion therewith.

28 is an ordinary throttling governor which controls the supply of oil to the burners 7 through the lever 29 which is secured on the same rock-shaft 30 with the short levers 31 which control the position of the valve stems 32 in the burners. These stems are provided with springs to keep them constantly in contact with the short levers 31.

33 is a centrifugal governor of the flywheel type in which the eccentric pin 34 moves radially toward its center of rotation when the speed increases and moves in the opposite way when the speed is slackened. The connecting bar 35 and the arm 36 convey motion from the pin 34 to the rock-shaft 37. This shaft is supported in bearings 36' and operates valves 11 and 14 by means of the lever arms 39 and 40 respectively and the connecting rods 41 and 42 which actuate the swing-arms 43 and 44 of the valves 11 and 14. This mechanism is so adjusted that the valves open alternately for admission to and discharge from each of the coils 8 and 9, and the degree of opening is regulated by the governor 33.

45 is a pipe leading direct from the steam space of the boiler to the pipe 15. This pipe is provided with a cut-off valve 46 and is used for conducting steam to the valve or adjustable nozzle 16 when the superheating apparatus is not in operation. This valve 16 is provided with a stem 50 carrying a hand-wheel 51.

52 is a damper in the smoke pipe provided with a lever 53 connected by the link 54 with a rack 55 engaging a pinion 56 on the stem 50 whereby the damper 52 becomes closed when the valve 16 is open. The valve or nozzle 16 is surrounded by a casing 60 which leads from the smoke stack to the interior of casing 17. Casing 60 terminates in an annular passage 61 into which a series of tubes 62 lead from the valve 16.

The operation of the device is as follows: After steam is gotten up in the boiler, valve 13

43 in pipe 15 is opened. The shaft 25 is now disconnected from the motor by means of the clutch 26 and given a few turns by the hand-wheel 47. This brings the valves 11 and 14 into operation and steam passes from the superheater to the air passages leading to the motor. As soon as the motor comes into operation, the shaft 25 is again connected by the clutch 26 and the action of the valves controlling the superheater becomes constant and automatic. Steam flows into the coils 8 and 9 by the valve 11 and is allowed to pass out from the coils alternately by the action of the valve 14, the steam being detained and heated in one of the coils during the time of its discharge from the other.

Where it is not convenient to operate the valves by means of the hand-wheel on the shaft 25, the pipe 45 leading direct from the steam space of the boiler may be utilized for initial operation with wet steam, the wet steam being cut off by the valve 46 and superheated steam being supplied through the pipe 15 as soon as the motor, and with it the valve gear, comes into operation. In either case, the action of the governor 28 opens the valves in the burners 7 which are then ignited, either by hand or from pilot lights previously ignited. The burners then supply a blast of flame through the casing 5 where it impinges upon the coils and finds vent through the stack 2. The alternate charges of wet steam which are confined within the coils and cut off from the boiler are thus superheated and the pressure in the coils increased many-fold beyond that of the steam in the boiler. This superheated steam of high pressure passes with great velocity from each coil while the other is being filled and heated, the desired action being secured by proper adjustment of the mechanism operating valves 11 and 14.

The difficulty hitherto experienced in nearly all superheating devices; namely, liability to injuriously overheat the coil or other apparatus in which the steam is heated, I have overcome by my method of governing the application of heat according to the quantity of steam passing through the coils. When the engine is running under heavy duty, the governor 33 responds to the somewhat slackened speed and causes the eccentric pin 34 to rotate through a larger circumference. This will increase the angular movement of the rock-shaft 37 with the result of admitting increased quantities of steam to the superheating coils and from them to the motor. At the same time the governor 28 acts upon the valve-stems 32 in the burners 7 through the levers 29 and 31 so as to admit a larger amount of fuel to the burners. When the load on the engine is diminished, the tendency to increase its speed is corrected by the governor 33, which, now acting in the opposite manner, diminishes the supply of steam to the coils and from them to the motor. This calls for a reduction in the amount of heat applied to the coils, if danger of overheating them is to be averted. This result is secured by the governor 28 acting in a manner opposite to that just described and diminishing the amount of heat applied to the coils. This arrangement not only prolongs the life of the coils, but provides an important feature of economy in the use of fuel, the amount of fuel consumed being governed directly according to the duty placed upon the engine. It also admits of using a boiler of quite limited strength and capacity. A further advantage of economy in the production of steam in the boiler results from the manner in which the hot gases are drawn from the stack. When but little or no steam is being used, the fire burns under natural draft only, but with larger consumption of steam, the gases are so drawn from the stack as to produce an artificial or forced draft, and this draft is produced just in proportion to the steam demands upon the boiler. With a proper setting of the adjustable nozzle 16, steam and furnace gases enter the annular passage 61 and issue therefrom to the perforated annular expanding passage formed by the shells 18 and 19 at very high velocity—a velocity which tends to increase with the expansion of the steam toward the larger end of the passage. The air drawn through the perforations in the passage becomes expanded by the heat of the steam and of the furnace gases and, taking up their energy, passes with them to the motor as a power fluid of large volume, relatively high density and low velocity. The energy of this moving mass of air and steam mingled with furnace gases represents the total energy of the steam discharged at the nozzle 16 and the added energy contributed by the heat of the furnace gases. This total energy is now carried in medium of low velocity, which fact makes it much more available for efficient use in the motor.

In Fig. 4, a modification of the apparatus above described is shown. In this arrangement it is intended only to superheat the steam in the coils 8 and 9 and not to increase its pressure above that in the boiler. The valves 11 and 14 of Fig. 1, and the mechanism connected therewith, are, therefore, dispensed with and the steam is allowed to pass through the coils as in the ordinary form of superheaters. A throttle valve 48, however, is placed in the pipe 15 and connected by the rod 49 with the lever 29. The governor 28 now serves not only to vary the supply of fuel for the burners 7, according to the duty placed upon the engine, but it governs also the passage of steam through the valve 48 according to the power requirements. With this arrangement, using only one governor, the heat applied to the coils is proportioned, as before, to the amount of steam passing through them, the only difference being that the steam is utilized at boiler pressure instead of at a higher pressure produced within the superheating coils.

It will be obvious that my method of transferring the energy of the steam and furnace gases to a current of air could be carried out by the use of wet steam and without any superheating apparatus. I deem it preferable, however, to superheat the steam in order that it may suck in and expand the maximum quantity of air, and for the highest results I employ the apparatus which I have described for confining the steam in the superheater and greatly increasing its pressure at the same time that it is superheated.

Having now fully described my invention, what I claim is:

1. The combination with a steam engine boiler and superheater of independent means for firing the superheater, and means for controlling the supply of fuel to said firing means in accordance with the duty on the engine.

2. The combination with a steam boiler and superheater of independent means for firing the superheater, and combined means for controlling the supply of fuel to said firing means and the quantity of steam passing through the superheater.

3. The combination with a steam boiler and superheater of independent means for firing the superheater, and automatic means for controlling the supply of fuel to said firing means and the quantity of steam passing through the superheater.

4. The combination with a steam boiler and engine of a superheater having independent firing means, and an automatic governing device connected with the engine to control the flow of steam from the superheater and to control the supply of fuel to the firing means.

5. The combination with a steam boiler and engine of a superheater comprising a plurality of coils or other heating receptacles, means for admitting, confining and releasing successive charges of steam to and from the several coils in rotation, means for superheating the charges thus confined, means for conducting to the engine the charges thus released, and means connected with the engine for governing the period of admission to and the period of release from the superheater.

6. The combination with a steam engine boiler of a superheater comprising a plurality of coils or other heating receptacles, independent means for firing the superheater, means for admitting, confining and releasing successive charges of steam to and from the several coils in rotation, and means for controlling the supply of fuel to said firing means in accordance with the duty on the engine.

7. The combination with a steam boiler of a superheater comprising a plurality of coils or other heating receptacles, independent means for firing the superheater, means for admitting, confining and releasing successive charges of steam to and from the several coils in rotation, and combined means for controlling the supply of fuel to said firing means and the quantity of steam allowed to pass through the superheater.

8. The combination with a steam boiler of a superheater comprising a plurality of coils or other heating receptacles, independent means for firing the superheater, means for admitting, confining and releasing successive charges of steam to and from the several coils in rotation, and automatic means for controlling the supply of fuel to said firing means according to the quantity of steam allowed to pass through the superheater.

9. The combination with a steam boiler and engine of a superheater comprising a plurality of coils or other heating receptacles, independent means for firing the superheater, means for admitting, confining and releasing successive charges of steam to and from the several coils in rotation, and an automatic governing device connected with the engine to control the flow of steam from the superheater and to control the supply of fuel to the firing means.

10. The combination with a steam boiler and engine of a superheater comprising a plurality of coils or other heating receptacles, means for admitting, confining and releasing successive charges of steam to and from the several coils in rotation, and means connected with the engine for governing the period of release from the superheater.

11. The combination with a steam boiler and engine of a superheater comprising a plurality of coils or other heating receptacles, means for admitting, confining and releasing successive charges of steam to and from the several coils in rotation, independent means for firing the superheater, automatic means for controlling the supply of fuel to said firing means, and means connected with the engine for governing the period of admission to the superheater.

12. The combination with a steam boiler and engine of a superheater comprising a plurality of coils or other heating receptacles, means for admitting, confining and releasing successive charges of steam to and from the several coils in rotation, independent means for firing the superheater, automatic means for controlling the supply of fuel to said firing means, and means connected with the engine for governing the period of release from the superheater.

13. The combination with a steam boiler and engine of a superheater comprising a plurality of coils or other heating receptacles, means for admitting, confining and releasing successive charges of steam to and from the several coils in rotation, independent means for firing the superheater, automatic means for controlling the supply of fuel to said firing means, and means connected with the engine for governing the period of admission to and the period of release from the superheater.

14. The combination with a steam engine, boiler and superheater of independent means for firing the superheater, and means for controlling the supply of fuel to said firing means in accordance with the duty on the engine, said means comprising a fuel supply pipe, a valve therein and a centrifugal governor connected with the engine and with said valve.

15. The combination with a steam boiler and superheater of independent means for firing the superheater, and combined means for controlling the supply of fuel to said firing means and the quantity of steam passing through the superheater, said means comprising a fuel valve connected with said firing means, a valve connected with the superheater and connections between said valves.

16. The combination with a steam boiler and engine of a superheater having independent firing means, and an automatic governing device connected with the engine to control the flow of steam from the superheater and to control the supply of fuel to the firing means, said device comprising a centrifugal governor connected with the engine, a fuel valve connected with the firing means, a valve connected with the superheater and connections between the governor and said valve.

CHRISTOPHER JOHN LAKE,
(Formerly JOHN CHRISTOPHER LAKE.)

Witnesses:
C. A. Brown,
Thomas Barr.